United States Patent [19]

Gold

[11] 4,162,831
[45] Jul. 31, 1979

[54] CAMERA AND METHOD FOR SELECTIVELY COMPRESSING SCENE BRIGHTNESS

[75] Inventor: Nathan Gold, Framingham, Mass.

[73] Assignee: Polaroid Corporation, Cambridge, Mass.

[21] Appl. No.: 879,960

[22] Filed: Feb. 21, 1978

Related U.S. Application Data

[63] Continuation of Ser. No. 756,433, Jan. 3, 1977, abandoned.

[51] Int. Cl.$^2$ ................................................ G03B 7/08
[52] U.S. Cl. ......................................... 354/31; 354/48; 354/236
[58] Field of Search ................. 354/31, 48, 50, 51, 354/226, 227, 234, 236, 250, 258, 261; 355/80, 81

[56] References Cited

U.S. PATENT DOCUMENTS

| | | | |
|---|---|---|---|
| 2,953,983 | 9/1960 | Larson | 354/236 |
| 3,116,670 | 1/1964 | Ball | 354/50 X |
| 3,409,378 | 11/1968 | Shimomura | 356/222 |
| 3,442,198 | 5/1969 | Biber | 354/270 |
| 3,479,936 | 11/1969 | Land | 354/43 X |
| 3,504,603 | 4/1970 | Brzonkala et al. | 354/31 X |
| 3,511,142 | 5/1970 | Biber | 354/31 |
| 3,521,954 | 7/1970 | French | 355/80 |
| 3,555,987 | 1/1971 | Browning | 354/227 |
| 4,050,814 | 9/1977 | McFadden | 354/227 X |

Primary Examiner—John Gonzales
Attorney, Agent, or Firm—David R. Thornton

[57] ABSTRACT

A photographic exposure control system incorporating a multizone shutter arrangement and a photoresponsive array, with each element of the array being responsive to one of a plurality of spacially oriented areas of the photographic scene and in control of one shutter zone which transmits image-carrying rays from that scene area to a pictorially corresponding area of the film to selectively compress the range of scene brightness to within the linear range of the film thereby enhancing shadow detail. In the illustrated embodiment, the exposure system in effect controls the multi-zone shutter to expose film areas corresponding to bright scene areas, having a relative brightness falling within the linear range of the film, at one exposure factor and film areas corresponding to darker scene areas at a greater exposure factor.

31 Claims, 9 Drawing Figures

CAMERA AND METHOD FOR SELECTIVELY COMPRESSING SCENE BRIGHTNESS

CROSS REFERENCE TO RELATED APPLICATION

This is a continuation of application Ser. No. 756,433, filed Jan. 3, 1977, now abandoned.

BACKGROUND OF THE INVENTION

This invention relates to a camera, and more particularly, to an exposure system for differentially varying the film exposure over a film frame.

In photographing a scene having large variations in spatial brightness, and particularly where exposure is carried out under the control of a photocell, it is not unusual for details in the brightest regions to be washed out by over-exposure and for details in the darkest region to be concealed by under-exposure of the photosensitive material on the film frame. For a given scene, the extent of the problem depends on the characteristic curve, (i.e., the density-log exposure curve) of the photosensitive material being used. Where the brightness range in the scene being photographed and the photosensitive film material are such that many details are lost by reason of the exposure being determined by the average scene brightness, improved results can be achieved, for some scenes, by controlling exposure in accordance with a spatially weighted average of scene brightness. Thus, it is conventional to weight the photocell viewing angle to reduce the response to light from the upper portion of a scene, which usually will be the sky during daylight, outdoor photography so that the photosensitive element will be more responsive to the central portion of the scene where a person's face, for example, is located in the usual photographic setting. In such case, the central region, where it is desired for the detail to be the most distinct, will dominate the photocell's response and will result in a more pleasing photograph at the expense of some regional over- or under-exposure in peripheral portions of the photograph. The photocell response can be modified by optics associated with the photocell. Alternatively, the response can be electronically modified such as shown in U.S. Pat. No. 3,409,378. Regardless of the technique utilized, however, any improved result will depend on whether the actual scene being photographed corresponds to the design criteria built into the photocell response.

Improvement in the recorded detail of the photographic image has been achieved by focal plane shutters having a modulated aperture width for differentially exposing individual regions of a film frame in accordance with the brightness of the regions in the scene being photographed. U.S. Pat. No. 3,116,670, which is typical of the above-noted shutter mechanism, discloses a focal plane shutter having means for controlling aperture width to modulate the light reaching the photosensitive material during the transit thereover of the shutter curtain. Such means includes a photocell positioned to receive light passing through the camera lens and reflected from a narrow strip at the leading edge of the curtain slot, and an electromagnet for modulating the width of the slot in accordance with the output of the photocell. Thus, the exposure of elemental strips of the photosensitive material is modulated in accordance with the average brightness of the scene within the strip. Other examples of variable focal plane shutters are described in U.S. Pat. Nos. 3,479,936 and 3,442,198.

While the above-noted shutter mechanisms may give improved results in scenes where the brightness gradient runs in the same direction as the direction of movement of the shutter, such improvements are generally limited when the brightness gradient in all or a part of the scene is parallel to the slot of the shutter curtain. Furthermore, by reason of the time required for a focal plane shutter to complete its traverse of a film frame, this approach is not suitable for a hand-held camera where maximum exposure time should not exceed about 1/30 of a second to prevent blurring due to reflex movements on the part of the photographer.

In the above-noted cameras, the exposure of selected scene areas are essentially compressed so that each area of the film frame receives approximately the same quantity of light flux and will have the same average density. The value of the average density is dependent on the characteristic curve (density vs. logarithm exposure curve) of the photosensitive material. The predetermined amount of light that the shutter slot is permitted to transmit is preferably chosen to correspond to an exposure lying about midway in the linear portion of the characteristic curve. This choice maximizes the amount of detail that can be obtained, however, a photograph made in this manner, is not a realistic reproduction of a scene and if the compression is carried to the extreme, will be "flat" or "gray" in the sense of its being of uniform average density throughout. Since darker regions of a scene are expected by an observer to be much darker in a photograph than lighter regions in the scene, the resultant photograph will not in all cases be as aesthetically pleasing as is desirable.

It is therefore an object of the present invention to provide a new and improved exposure control system and apparatus for optimizing an exposure over the film frame.

Another object is to provide an improved exposure control system for selectively compressing the range of recorded scene brightness to enhance picture detail while retaining the relative brightness of many of the scene areas.

SUMMARY OF THE INVENTION

Briefly, the invention comprises means for sensing the brightness of a plurality of spacially oriented scene areas and for determining one exposure value in accordance with the brightest of said areas and another exposure value in accordance with the darkest of said areas, means for independently controlling the transmission of image-carrying light rays from each of said scene areas to corresponding film areas, and means responsive to said sensing means for varying said transmission means to expose at least one of said film areas at said one exposure value and another film area at said other exposure value.

According to the present invention, exposure control apparatus is provided for a camera having a shutter mechanism constituted by a plurality of shutter elements, independently and selectively operable, to transmit light from a scene being photographed to corresponding elemental areas of photosensitive material carried by a film frame located behind the shutter mechanism. The exposure control apparatus includes a photosensitive device associated with each shutter element for determining the average brightness of light transmitted by the shutter element when the latter is operated, and means associated with each shutter element for operating the same in accordance with the average brightness of light transmitted thereby. Control means is provided for initiating operation of each of the shutter elements and for causing the shutter element that transmits light having the maximum average brightness to operate for a minimum exposure time interval within which this shutter element transmits a preselected maximum amount of light corresponding to an upper exposure limit, and causes the majority of the remaining shutter elements to also operate for only this minimum time if the amount of light transmitted by these elements within said minimum time interval lies between said maximum amount of light and a preselected minimum amount of light corresponding to a lower average exposure limit. For shutter elements that transmit less than said preselected amount of light within said time interval, the control means causes their operation to continue for a period greater than said time interval, and until the shutter element associated with the given operator transmits said preselected minimum amount of light or until a preset time limit has elapsed.

The elemental areas exposed by the shutter elements will have an average density within the limits established by the minimum and maximum average exposure limits which, preferably, are located near the terminal ends of the linear portion of the characteristic curve of the photosensitive material being used. The average density produced by the brightest elemental area of a scene being photographed will be the density associated with the maximum exposure regardless of the high brightness magnitude of the brightest area; and the average density of the darkest elemental areas will be the density associated with the minimum exposure limit regardless of the low brightness magnitude of the darkest area. As a consequence, relative brightness will be retained for the brightest portions of the photograph without washout of very bright areas while shadow detail of dark areas are enhanced.

BRIEF DESCRIPTION OF THE DRAWINGS

An embodiment of the invention as shown in the accompanying drawings wherein.

DESCRIPTION OF THE PREFERRED EMBODIMENT

Figure 1:
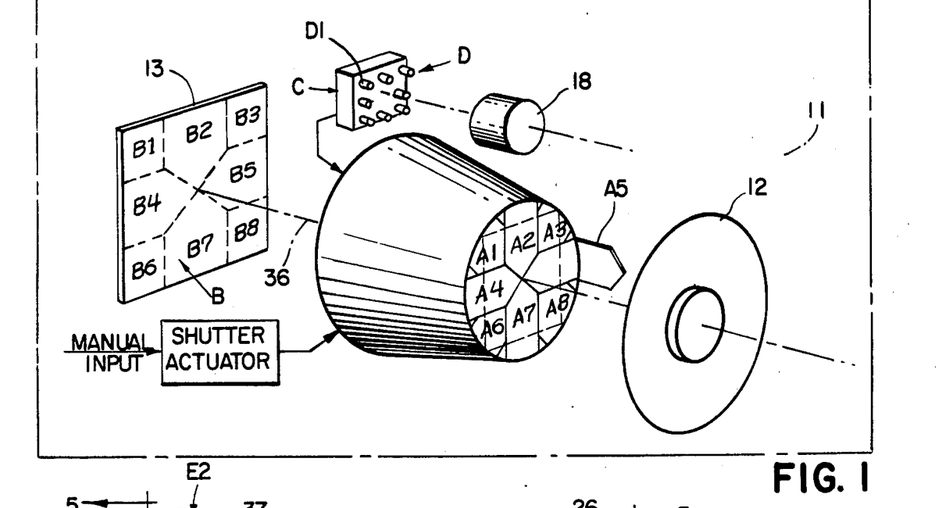
FIG. 1 is a diagrammatic perspective view of the major components of the camera of the present invention, illustrating the multi-segment shutter mechanism thereof and the elemental areas on the film frame with which each shutter segment is associated.

Referring now to FIG. 1, reference numeral 10 designates a shutter mechanism according to the present invention incorporated into camera 11 between objective lens 12 of the camera and photosensitive film frame 13 for photographing a scene on the film frame in response to a manual input applied to shutter actuator 14 (e.g., manual depression of a shutter release button). Mechanism 10 comprises shutter A for effecting exposure of area B on film frame 13 under control of a light evaluating means C which includes a photosensitive device or array D located behind lens 18. The field of view of device D roughly approximating the field of view of film frame 13.

Shutter mechanism A comprises a plurality of shutter elements A1-A8, each of which is spacially arranged to be associated with respective elemental areas B1-B8 of film frame area B, and each of which is selectively operable independently of the other elements for controlling the transmission of light from the scene to only that elemental area which is spacially oriented in a corresponding manner. The light evaluating means C comprises a plurality of means C1-C8 (FIG. 2) respectively associated with the shutter elements for independently operating the same under the influence of device D which comprises a plurality of photodetectors D1-D8, each respectively associated with one of the operating means C1-C8. Detectors D1-D8 are spatially arranged in the same pattern as shutter elements A1-A8 so that detector D1, for example, receives light from the same portion of the scene being photographed as elemental area B1 when shutter element A1 is operated. The resistance of detector D1 is functionally related to the brightness of light incident on area B1 when element A1 is operated.

Mechanism 10 is axially spaced from film frame 13 a distance sufficient to defocus the image of the shutter elements so that the edges of the elemental areas on the film frame actually overlap thus preventing the edges of the shutter elements from producing sharp boundaries on the film frame. To simplify the drawing, however, the elemental film areas are shown congruent with the shutter elements with which they are associated. Hence, the shutter mechanism 10 is located sufficiently close to the focal plane such that each shutter element essentially controls the light passing to the film area directly behind the shutter, but spaced far enough from the film plane to defocus the edges of each element, when the element is closed. The latter spacing which provides blurring of the element edges, permits some spillover from one shutter zone to film areas adjoining its associated area, however, if the shutter mechanism 10 is spaced much closer to the focal plane than the lens, each element will still control the primary contribution to the exposure of its associated film area.

Effectively, each shutter element and the drive means associated therewith constitutes a separate shutter or shutter zone for controlling the amount of light incident on the elemental film area or film zone with which the shutter element is associated. For this reason, only one shutter element and its associated drive means will be described.

Figure 2:
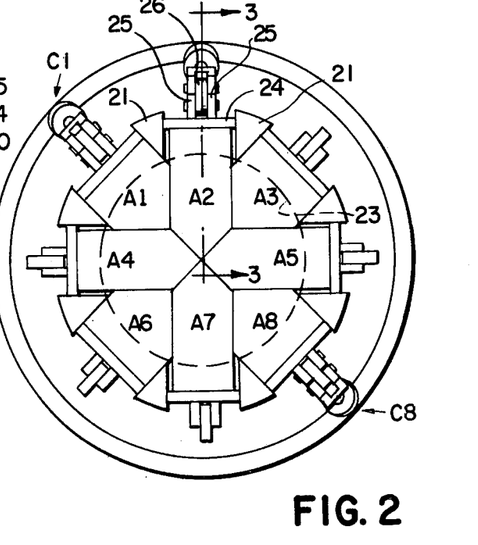
FIG. 2 is a more detailed front view of the preferred embodiment of the shutter mechanism employed in FIG. 1.
Figure 5:
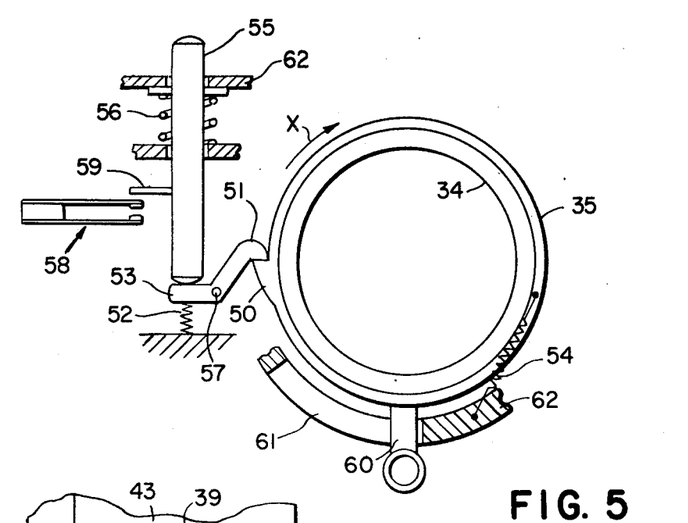
FIG. 5 is a front view of the actuating ring of the shutter mechanism taken along line 5—5 of FIG. 3.

As shown in FIG. 2, each shutter element is in the form of an opaque member which has a first state in which the member is in an unblocking position with respect to the film frame for effecting transmission of light to the elemental area with which the member is associated, and a second state in which the member is in a blocking position for preventing transmission of light to such elemental area. Specifically, each member comprises a flap 19 (FIG. 3) pivotally connected at 20 between a pair of bosses 21 located on the forward axial face of sleeve 22 having an aperture 23 of a size compatible with lens 12 for transmitting light from the scene being photographed to film frame 13. Sleeve 22 is rigidly attached to the camera housing 62 (FIG. 5).

Figure 3:
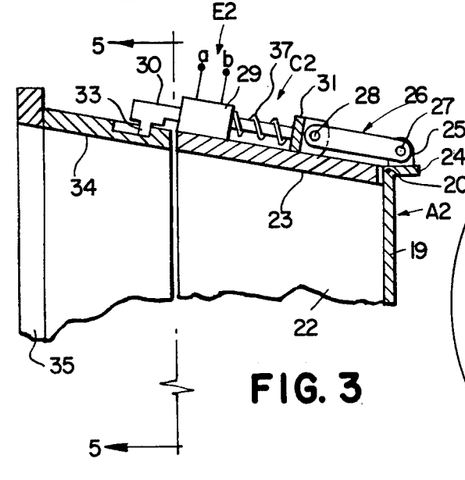
FIG. 3 is a cross-sectional view taken along the line 3—3 of FIG. 2 showing a shutter element in its blocking terminal position.

A flange 24 extends perpendicularly from flap 19 adjacent pivot 20 and is provided with a pair of spaced ears 25 between which one end of link 26 is received to define a pivotal connection 27. The other end of link 26 is connected by pivot pin 28 to the armature of an electromagnet of the operating means associated with the member to which the link is connected.

FIG. 3 shows electromagnet E2, which is associated with shutter element A2. Each electromagnet comprises a coil 29 with which armature 30 is operatively associated. One end of armature 30 carries yoke 31 to which pin 28 is attached, and the other end of the armature carries a cam follower 33 operatively engaged with cam means 34 carried by ring 35 pivotally mounted on the housing of the camera for rotation, with respect to sleeve 22, about the optical axis 36 (FIG. 1). Spring 37 is interposed between coil 29 and yoke 31 such that the spring, through link 26, biases the flap 19 to its blocking position as shown in FIG. 3.

Figure 6:
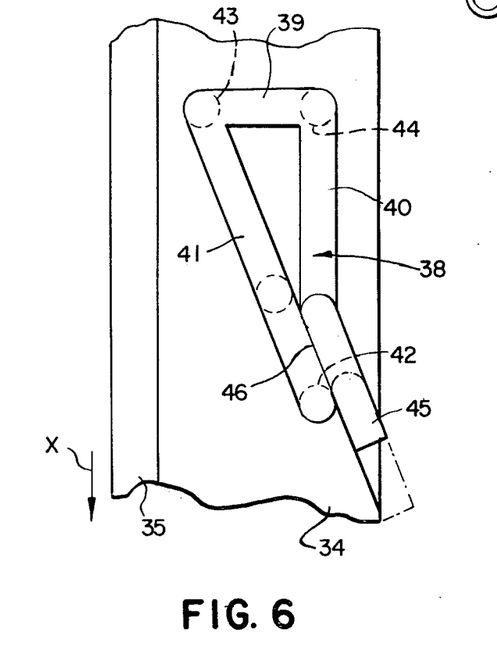
FIG. 6 is a developed view of a cam disc associated with the actuating ring.

As shown in FIG. 6, cam means 34 is provided with a plurality of triangular sets of cam grooves 38, each set being associated with one of the electromagnets of the operating means. Each set of grooves includes an axially directed portion 39 connected to a transverse portion 40 which is also connected by an inclined portion 41 to portion 39. Cam follower 33 operatively engages the groove 38. When the follower is located at position 42, the armature occupies the position shown in FIG. 3 where flap 19 is in its blocking position. By rotating ring 35 in the direction of arrow X relative to sleeve 22 through a predetermined angle, follower 33 will move along with portion 41 of the groove axially displacing the armature from its extended position shown in FIG. 3 to its retracted position shown in FIG. 4. This axial displacement moves flap 19 from its blocking to its unblocking position against the bias of spring 37. If coil 29 of the electromagnet is energized just prior to the time that the follower arrives at position 43 in the groove, armature 30 will remain in the position shown in FIG. 4 against the bias of spring 37 thus holding the flap in its unblocking position until coil 29 is de-energized.

Figure 4:
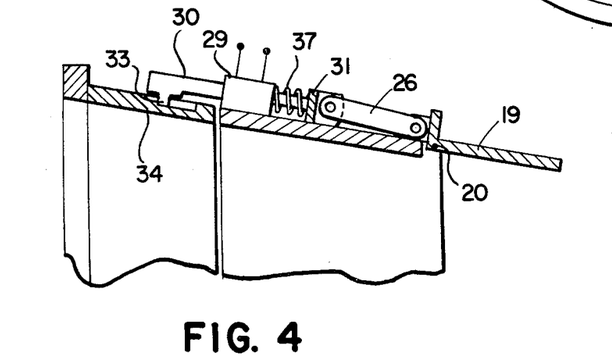
FIG. 4 is a view similar to FIG. 3 but showing the shutter element in its unblocking terminal position.

When coil 29 is de-energized, spring 37 moves armature 30 from its position shown in FIG. 4 back to the position shown in FIG. 3 as follower 33 moves in portion 39 of groove 38 in the cam means 34 to position 44. Flap 19 is thus returned to its blocking position. By rotating ring 35 in a direction opposite to arrow X, follower 33 will move along portion 40 of groove 38 causing slide 45 to be retracted against a spring bias (not shown) in the process until follower 33 reoccupies position 42. When this occurs, slide 45 snaps back to the position shown in FIG. 6 to provide an edge 46 against which the follower bears when ring 35 is once more moved in the direction of arrow X.

The manner in which ring 35 is moved in the direction of arrow X and in the opposite direction is shown in FIG. 5. As indicated previously, ring 35 is rotatably mounted with respect to camera housing 62, and is provided with a lug 50 projecting therefrom for operative engagement with pawl 51 which is pivotally mounted on the camera housing for engagement with the lug 50 by reason of the action of spring 52 acting on tail 53 of the pawl. Ring 35 is urged in the direction of arrow X by spring 54. When shutter release button 55 is depressed against the action of spring 56, tail 53 of pawl 51 pivots about pin 57 removing the pawl from lug 50 and allowing spring 54 to rotate ring 35 sharply in the direction of arrow X. When this occurs, each of the armatures associated with the coils of electromagnets E1-E8 (FIG. 7) mounted on sleeve 22 is rapidly moved from a retracted position shown in FIG. 3 to an extended position shown in FIG. 4, simultaneously moving each of the flaps from blocking to unblocking position. Simultaneously with the inward movement of shutter release button 55, initiating switch 58 is closed by engagement with the projection 59 of the shutter release button for the purpose of simultaneously energizing electromagnets E1-E8.

Electrical portion 16 (FIG. 7) of exposure control apparatus C de-energizes an electromagnet after the shutter element operated thereby transmits an amount of light determined by device D. For example, electromagnet E1 is de-energized in accordance with the average brightness of the light transmitted by element A1 as determined by detector D1. Upon de-energization of electromagnet E1, element A1 is released and returns to its blocking position under the bias exerted by coil spring 37 operating on the armature of this electromagnet.

After each of the flaps 19 is returned to its blocking position, ring 35 can be returned to its initial position in a direction opposite to the direction of arrow X by applying a manual return movement to extension 60 which is rigidly attached to the ring and extends through an opening 61 in the housing 62 of the camera. Manual return movement applied to the ring can occur until pawl 51 snaps behind lug 50 preparing the ring for simultaneously opening the flaps during the next cycle of operation of the shutter mechanism.

The flaps 19 are designed to meet or just overlap at the center of aperture 23 to prevent light leakage and can be loosely hinged at 27 to prevent hang up of one flap on the other. Further, the electrical control circuit may also be arranged to always ensure slightly staggered rather than simultaneous closing of any two flaps.

Hence, it should be understood that the detectors D1-D8 provide means for sensing the brightness of spacially oriented areas of the scene and, stated otherwise, means for sensing the value of light flux passing to each area of the film. In conjunction with its integrator circuit, later explained with regard to FIG. 7, they provide means for sensing the total amount of light flux transmitted to a given film area during the exposure interval of the shutter zone associated with that film area. The cam means 34 provides selectively operative means for initiating operation, that is, unblocking of the shutter elements while the electromagnet arrangements E provide selectively operative means for terminating each shutter zone operation, and together provide actuatable drive means for operating or actuating each shutter element between a non-transmissive (unblocking) condition and a transmissive (light blocking) condition.

Figure 7:
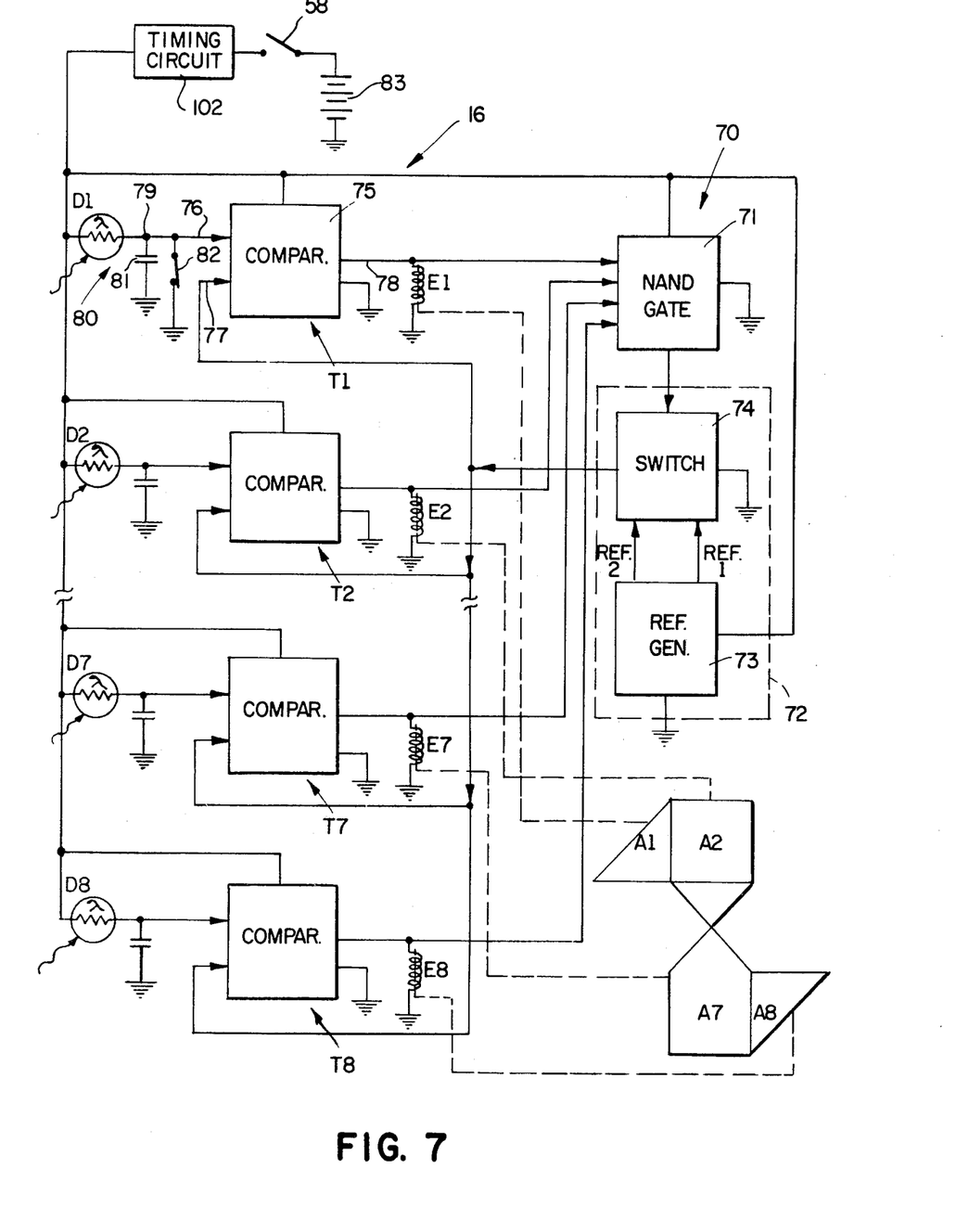
FIG. 7 is a block diagram of the exposure control apparatus of the present invention for operating the shutter elements shown in FIGS. 1-4.

Additionally, the electrical circuit portion 16 provides means, responsive to the shutter drive means, for determining two different exposure factors, more specifically two different exposure intervals, and for controlling the shutter to expose some film areas at one exposure factor and other film areas at a second exposure factor thereby enhancing shadow detail of the areas exposed at the larger of the two factors.

Referring now to FIG. 7, portion 16 of the light evaluating means C according to the present invention includes a plurality of trigger circuits T1-T8 respectively associated with electromagnets E1-E8, a gate 71, and a threshold generator 72, made up of a reference generator 73 and a two-state switch 74. Only four trigger circuits are shown in FIG. 7 to facilitate illustration, but all are identical and only circuit T1 will be described in detail.

Trigger circuit T1 comprises a two-state comparator 75 having a signal input 76, a reference input 77, and a single output 78 for energizing electromagnet E1 when the comparator is in its first state. A reference voltage derived from generator 72 is applied to input 77 of the comparator. Generator 72 produces two levels of voltage, one of which is designated "Ref. 1", and is higher than the other level designated "Ref. 2". One or the other of these levels is supplied to input 77 of the comparator in accordance with the state of switch 74. The comparator is in its first state only when the voltage at input 76 is below the voltage at input 77. When the voltage at input 76 is above the voltage at input 77, the comparator 75 is in its second state wherein the electromagnet is de-energized. Note that higher and lower refer to the magnitude of the voltage, and the actual polarity (positive or negative) depends on the specific circuit design.

Input 76 to the comparator is connected to node 79 of integrator 80 (which constitutes a photosensitive device) and comprises photodetector D1 and capacitor 81, which is shunted by a normally closed switch 82 that is opened when shutter element A1 is moved to its unblocking position. The time constant of integrator 80 is thus the product of the value of capacitor 81 and the resistance of detector D1, which is functionally related to the average brightness of an elemental area of the scene being photographed which corresponds to elemental area B1 of the film frame.

Instead of being responsive to light from the scene directly, photometric device D could be used in association with an optical system wherein detector D1 receives light reflected from elemental area B1. In either event, detector D1 and capacitor 81 of the integrator establish the time constant of the integrator which is dependent on the average brightness of light transmitted by element A1 and incident on area B1.

When switch 58 is closed, the voltage at node 79 and input 76 is essentially at ground while the voltage at input 77 of comparator 75 is at the "Ref. 1" level causing the comparator to go into its first state energizing electromagnet E1. If the magnetomotive force of this electromagnet is sufficiently strong, its armature will be retracted against the bias of spring 37 (FIG. 3) moving element A1 to its unblocking position. However, it is preferred to mechanically retract the armature, as operation of element A1 is initiated, by using cam means 34 in order to minimize power consumption from battery 83, and to design the electromagnet such that its pulling force is just sufficient to hold the armature retracted against the bias of spring 37. With the opening of switch 82 (which occurs when element A1 reaches its unblocking position), the voltage at node 79 increases exponentially toward the battery voltage as capacitor 81 charges with a time constant dependent on the resistance of detector B1 and the value of capacitor 81. Such voltage is thus a time-variable signal functionally related to the average brightness of light transmitted by shutter element A1 when the latter is operated.

When the voltage at node 79 reaches a threshold, as defined by the voltage at input 77 of the comparator, the latter will react by abruptly and regeneratively changing to its second state in which it de-energizes electromagnet E1 allowing shutter element A1 to return to its blocking position. For a given threshold, the amount of light transmitted by element A1 and incident on elemental area B1 during operation of the element is dependent only on the average brightness of that portion of the scene corresponding to this elemental area.

The output of each comparator is applied to gate 71 of control means 70. Gate 71 is of the type having a first state when all of the electromagnets in the outputs of the comparators are conducting (i.e., when all of the comparators are in their first state), and having a second state when any one or more (i.e., at least one) of the electromagnets is de-energized. When gate 71 is in its first state, switch 74 will be in a state that applies a level of "Ref. 1" to the reference inputs of each of the comparators of the trigger circuits. When gate 71 is in its second state, the state of switch 74 changes, applying the level of "Ref. 2" to the reference inputs of the comparators.

If the voltage at the signal input to any comparator of the other trigger circuits is above "Ref.2" level when the state of comparator 75 switches, the state of this comparator will also switch simultaneously with the change of state of comparator 75. The remaining comparators, at whose signal inputs the voltage is below "Ref. 2" level, will remain in their first state after comparator 75 changes to its second state. Thus, energization of the electromagnets driven by the remaining comparators will continue. As the voltage at the signal inputs to each of the remaining comparators reaches "Ref. 2" level, each comparator will change state de-energizing its electromagnet and terminating transmission of light by the element operated by that electromagnet.

Prior to further describing the overall operation of the exposure control system in detail, it should be noted that the terms exposure value or exposure factor as used in this application refer to camera exposure settings which for a given scene brightness will transmit a given total of light flux to the film and, hence, produce a given film exposure density. Both exposure interval and transmissivity (that is, aperture area and the transmissivity along the optical path) influence the actual exposure factor, however, where one of these is made a constant, as in the illustrated embodiment where only the exposure interval is varied, the remaining element is determinative of the selected exposure factor.

The present system provides one exposure factor (one exposure interval in the illustrated embodiment) for a first set of scene areas to retain the relative brightness of these areas in the recorded image and a different exposure factor (a different exposure interval) for the remaining scene areas. Hence, the brightness in the recorded image of these remaining scene areas are varied or compressed relative to the first set to enhance detail while the portion of the scene comprising the first set is faithfully recorded in terms of relative brightness.

This selective brightness compression of only some scene areas may be applied in a number of ways depending upon the camera structure and the desired end result. In the illustrated embodiment, a minimum exposure factor is determined which corresponds to those combination of camera parameters which will transmit a total amount of light flux from the brightest scene area to respectively provide a film exposure density at the upper density limit (designated 100 in FIG. 9) of the linear portion of film density versus log exposure curve and a maximum exposure factor which corresponds to camera parameters providing a total light flux from the darkest area to provide a film exposure density at the lower limit (designated 101 in FIG. 9) of the film density curve. Portions of the scene are exposed at the minimum exposure factor and others at the maximum. The brightest area of the scene being exposed at the minimum exposure factor, the darkest area at the maximum exposure factor, and many other scene areas exposed at one of these two factors to preserve relative scene brightness in the recorded image.

Preferably, all scene areas which at the minimum exposure factor provide a total amount of light flux exceeding the lower density limit are automatically exposed at the designated maximum exposure value; the precise value of the latter being determined by the brightest scene area. Hence, the relative brightness of these scene areas one to another are retained in the recorded image. The remaining (dark) scene areas whose total light flux during the minimum exposure factor falls below the lower density limit are exposed at increased exposure factors, each providing a light flux which achieves minimum film density; the precise value of the maximum exposure factor being determined by the darkest area. Hence, the relative brightness of the dark areas one to another are not retained but, more importantly, the exposure density of these dark areas are increased relative to other areas of the scene so as to enhance shadow detail. For typical photographic scenes, it is expected that a majority of the scene areas will be sufficiently close in relative brightness so as to be exposed at the selected minimum exposure factor and a minority of scene areas (dark areas) exposed at greater exposure factors Of course, all dark areas could also be exposed at the maximum exposure factor.

In the illustrated embodiment, as noted below, at least two different exposure values are provided by applying different exposure intervals to the shutter zones or segments. All film areas are first exposed for a minimum exposure interval (corresponding to the minimum exposure factor) at which the film area corresponding to the brightest scene area receives a sufficient amount of light flux to produce the given maximum exposure density. Then, only those film areas which during this minimum exposure interval did not receive a total amount of light flux equal to or exceeding that required to produce the given minimum exposure density are further exposed for greater exposure intervals proportional to their brightness with the maximum interval being determined by the darkest scene area (or a fixed maximum time interval where the darkest scene area would require an exposure time exceeding that considered suitable for hand-held cameras).

The manner in which the exposure control apparatus of FIG. 7 enhances contrast in the photosensitive material exposed by the above procedure will now be described in detail in connection with FIGS. 8 and 9. Assuming, for purposes of illustration, that when shutter elements A1, A2, A7 and A8 (FIG. 7) are operated, the average brightness of light transmitted by these elements is $I_1$, $I_2$, $I_7$, and $I_8$ related as follows:

$$I_1 > I_2 > I_7 > I_8$$

where $I_1$ is the maximum of the average intensities with respect to all of the shutter elements. The time constants $\tau_1$, $\tau_2$, $\tau_7$, $\tau_8$ of the corresponding trigger circuits will bear the inverse relationship, so that the voltage developed by the integrators of each of these trigger circuits will resemble curves 90–93 (FIG. 8). Since the light transmitted by element A1 has the maximum average brightness and provides the smallest integrator time constant, the voltage of the integrator of trigger T1 represented by curve 90, will reach the level "Ref. 1" before the voltages of the other triggers. As indicated, "Ref. 1" is reached after element A1 has been operated for the time interval $\Delta t_1$, which is termed the minimum exposure time interval. For a given level of "Ref. 1", it is a function of the maximum average brightness transmitted by any shutter element, and will thus be determined by the particular scene being photographed. In this sense, the minimum exposure time interval is not preselected.

The amount of light transmitted by element A1 within the minimum exposure time interval is determined by the level of "Ref. 1" with respect to the battery voltage, and is preselected to correspond to a maximum exposure limit $E_{max}$ on the characteristic curve of the photosensitive material being used. Preferably, $E_{max}$ is chosen at point 100 near the upper extremity of the linear portion 94 of characteristic curve 95 (FIG. 9). The level of "Ref. 1" establishes the maximum amount of light transmitted by the shutter element that transmits the maximum average amount of flux; such maximum amount of light being termed the "predetermined maximum light flux". It is transmitted in the minimum exposure time by the shutter element transmitting light from the scene area of maximum average brightness and is independent of the actual brightness of scene light. Thus, the brightest portion of a scene always exposes the corresponding area of the photosensitive material to the same average density. For this reason, it may be said that the brightness of the lightest portion of the scene is compressed to the film density associated with $E_{max}$.

The "preselected minimum" amount of light transmitted by any element is determined by the level of "Ref. 2" which is preselected to correspond to a minimum exposure limit $E_{min}$ on the linear portion 94 of the characteristic curve. Preferably point 101 lies near the lower extremity of portion 94.

Figure 8:
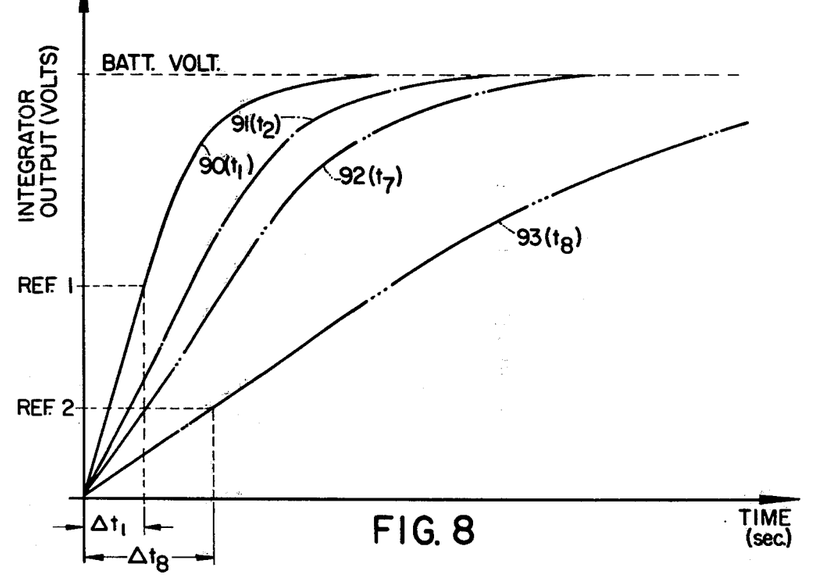
FIG. 8 is a voltage time plot of the output of an integrator for various time constants.
Figure 9:
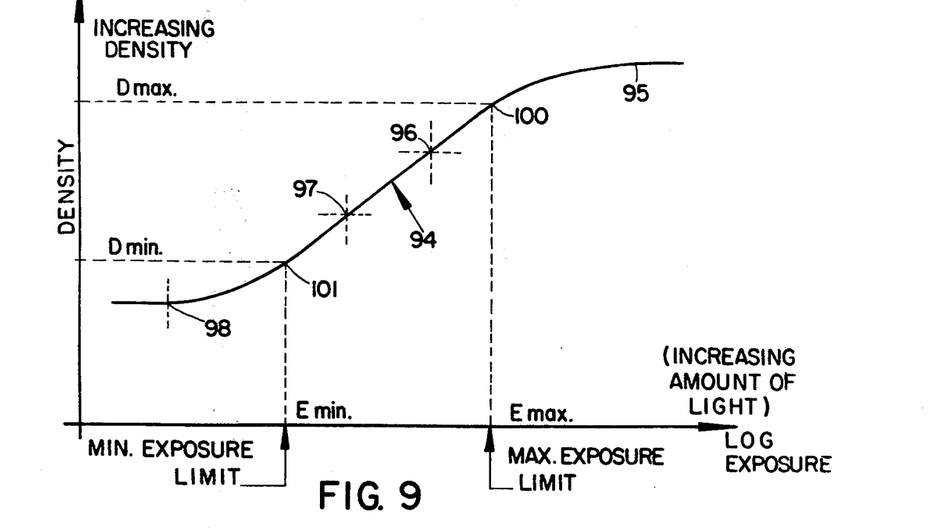
FIG. 9 is a characteristic curve for a typical photosensitive material used on the film frame for showing, in a qualitative manner, the relationship between density of the material and the logarithm of the exposure causing such density.

As seen in FIG. 8, operation of all of the shutter elements continues for at least a minimum exposure time interval designated $\Delta t_1$. Further operation of a given shutter element is terminated at the end of this time interval, if the amount of light flux the given element transmits lies between the preselected minimum and maximum amounts as established by the levels of "Ref. 1" and "Ref. 2". Shutter elements A2 and A7 meet this criterion (and hence close at $\Delta t_1$) because curves 91 and 92, which represent the signals generated by the integrators associated with these shutter elements, exceed or are equal to the level of "Ref. 2" after these elements have operated for the minimum exposure time interval. Note that curve 92 reaches the level of "Ref. 2" precisely at time $\Delta t_1$ with the result that shutter element A7 will transmit the preselected minimum amount of light. The brightness of the light transmitted by shutter element A7 thus can provide a criterion for controlling exposure since any shutter element transmitting light whose average brightness lies in the range defined by the maximum brightness (which can have any value), and the brightness of light transmitted by shutter element A7, will be operated only for the minimum exposure time interval. For this reason, the brightness $I_7$ is termed the "minimum light flux"; the term being used herein as defining the lower limit of a range whose upper limit is specified by the maximum average brightness which depends on the scene being photographed. In other words, the minimum light flux is not a fixed value, but will depend on the maximum brightness which, together with the level of "Ref. 1", establishes the minimum exposure time interval. Once this time interval is known, the minimum average brightness is known since it will depend on this interval and the level of "Ref. 2". Light of this brightness transmitted for the minimum exposure time interval will provide the preselected minimum amount of light.

Since the transmission of light by shutter elements A2 and A7 terminates at the instant transmission by element A1 terminates, these shutter elements transmit less than the predetermined maximum amount of light flux, but more than the predetermined minimum amount of light flux. Resulting average exposure of elemental areas B2 and B7 is indicated qualitatively in FIG. 9 by points 96 and 97 on curve 95. Accordingly, the average density of these areas will lie between the levels $D_{min}$ associated with the minimum exposure limit $E_{min}$, and the level $D_{max}$ associated with the maximum exposure $E_{max}$. Hence, the relative brightness of the scene areas corresponding with film areas B1, B2 and B7 are retained in the exposure since they are exposed at the same identical exposure value, i.e., in this arrangement, for the same exposure interval.

If the average amount of light flux transmitted by a given shutter element during the initial time interval is less than the minimum light flux as defined above, operation of the given shutter element continues beyond the minimum exposure time. This situation is illustrated by curve 93 which has not reached the level of "Ref. 2" at $\Delta t_1$. In other words, shutter element A8 will have transmitted less than the minimum amount of light flux when operation of the other shutter elements is terminated. Consequently, operation of this shutter element continues until the signal developed by the integrator of trigger T8 reaches the level of "Ref. 2", i.e., until shutter element A8 transmits the minimum amount of light flux. This occurs when element A8 has operated for the interval of time $\Delta t_8$, which is the time required for curve 93 to reach "Ref. 2". Consequently, area B8 will be exposed to the minimum exposure limit $E_{min}$ producing on this area an average density $D_{min}$. This should be compared with the exposure density value that would have resulted if operation of element A8 had been limited to the time interval $\Delta t_1$ in which case an exposure would have produced a film density indicated at point 98.

In this manner, the exposure density of the darkest area of the scene (corresponding to A8) is increased relative to the recorded brightness of other film areas thereby enhancing shadow detail. Now, under many scene conditions, several dark areas of the scene may continue to be exposed beyond the minimum exposure interval, in which case each of these would be exposed to that exposure interval during which their corresponding shutter segment will pass an amount of flux equal to the minimum exposure limit, with the darkest area exposed to the maximum interval. Hence, each of these remaining (dark) areas is exposed to minimum film density limit to enhance their detail, although relative brightness between these areas will be lost in the recorded image. The latter may be retained, however, by merely exposing these remaining areas at the maximum exposure interval.

It is conceivable that a situation could arise in which the light flux transmitted by a shutter element is so low that a considerable time would be required for the exposure to reach the minimum exposure, thereby giving rise to the possibility of camera movement and the consequent blurring of the image on the elemental area associated with that shutter element. To preclude this, a maximum time circuit 102 is interposed between battery 83 and the trigger circuits to limit the value of the maximum exposure factor to that of the maximum exposure interval. Delay 102 automatically interrupts circuit current a predetermined time after closure of switch 58.

Threshold generator 72 can take many forms. For example, it could be in the form of a transistor switch having a pair of serially connected bias resistors, the connection node being connected to reference inputs 77 of the comparators. When the transistor is non-conductive, the node will be at "Ref. 1"; and when conductive, the node will be at "Ref. 2".

While the shutter elements in the preferred embodiment are disclosed as pivotal flaps, it is possible to utilize sliding flaps instead. Such sliding flaps could move axially parallel to axis 36 of the shutter mechanism which could be provided with guides that would bend the free ends of the flaps toward the axis to a position that blocks light transmission. Alternatively, the shutter elements could be in the form of an electro-optical shutter wherein the transmission is a function of the voltage applied across a pair of transparent plates. In such case, each of the electro-optical shutters would be independently controlled by the output of a photocell. This arrangement has the advantage of not only providing on-off transmission, but can be utilized to provide proportional transmission.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. In a camera having a lens assembly for directing image-carrying rays from a scene to a frame of film material located at the camera focal plane, said film material having a density range extending between given minimum and maximum exposure density limits, the improvement comprising:

means for sensing the brightness of each of a plurality of spacially oriented areas of said scene;

a multizone shutter arrangement having a plurality of independently actuatable spacially oriented portions for independently varying the transmission of at least a significant portion of the image-carrying rays from each said scene area to a pictorially corresponding area of said film material;

means for independently actuating each said shutter portion; and control means responsive to said brightness sensing means for defining at least a first and second exposure factor in accordance with the brightness of said scene areas and said density range and for selectively controlling said actuating means to control at least one of said shutter portions in accordance with said first exposure factor to thereby expose a corresponding film area at said first exposure factor and to control at least another shutter portion in accordance with a said second exposure factor to thereby expose another corresponding film area at said second exposure factor.

2. The improvement of claim 1 wherein said control means includes means for determining one of said exposure factors in accordance with the brightest of said scene areas and the other of said exposure factors in accordance with one of the darkest of said scene areas.

3. The improvement of claim 1 wherein said control means includes means for determining one of said exposure factors in accordance with the brightest of said scene areas and said maximum density limit and the other of said exposure factors in accordance with the darkest of said scene areas and said minimum density limit.

4. In a camera having a lens assembly for directing image-carrying rays from a scene to a frame of film material located at the camera focal plane, said film material having a density range extending between given minimum and maximum exposure density limits, the improvement comprising:

means for sensing the brightness of each of a plurality of spacially oriented areas of said scene;

a multizone shutter arrangement having a plurality of independently actuatable spacially oriented portions for independently varying the transmission of at least a significant portion of the image-carrying rays from each said scene area to a pictorially corresponding area of said film material;

means for independently actuating each said shutter portion; and control means responsive to said brightness sensing means and to the brightness of a selected scene area and one of said film exposure density limits for defining at least one exposure factor which will expose the film area corresponding to said selected scene area to one of said film limits and for selectively controlling said actuating means to control at least two fo said shutter portions including the shutter element associated with said selected scene area in accordance with said one exposure factor to thereby expose the two corresponding film areas at said first exposure factor so as to expose said selected area at the limit of said film while retaining the relative brightness of scene areas pictorially corresponding to said two film areas.

5. The improvement of claim 4 wherein said selected area is the one scene area having the maximum average brightness and said one film limit is the maximum exposure density limit.

6. In a camera having a lens assembly for directing image-carrying rays from a scene to a frame of film material located at the camera focal plane, said film material having given minimum and maximum exposure density limits, the improvement comprising:

means for sensing the brightness of each of a plurality of spacially oriented areas of said scene;

a multizone shutter arrangement having several independently actuatable spacially oriented portions for independently varying the transmission of at least a significant portion of the image-carrying rays from each said scene area to a pictorially corresponding area of said film material;

means for independently actuating each said shutter portion; and control means responsive to said brightness sensing means for defining at least a first and a second exposure factor in accordance with the brightness of said scene areas and said film limits and for selectively controlling said actuating means to control a plurality of said shutter portions in accordance with said first exposure factor to thereby expos a plurality of corresponding film areas at said first exposure factor and to control at least one other shutter portion in accordance with said second exposure factor to thereby expose at least one other corresponding film area at said second exposure factor so as to essentially retain in the recorded image the relative brightness of scene areas pictorially corresponding to said plurality of film areas while varying with respect thereto the brightness in the recorded image of at least the scene area pictorially corresponding to said one other film area.

7. The improvement of claim 6 wherein said control means includes means for determining said first of said exposure factors in accordance with either the birghtest or darkest of said scene areas.

8. The improvement of claim 6 wherein said control means includes means for determining one of said exposure factors in accordance with the brightest of said scene areas and the other of said exposure factors in accordance with the darkest of said scene areas.

9. The improvement of claim 8 additionally including means for limiting the maximum value of said second exposure factor consistent with hand-held camera operation.

10. The improvement of claim 6 wherein said control means includes means for determining one of said exposure factors in accordance with the brightest of said scene areas and said maximum density limit and the other of said exposure factors in accordance with one of the darkest of said scene areas and said minimum density limit.

11. The improvement of claim 6 wherein said shutter portions vary the transmission from each scene area in direct proportion to the exposure interval during which each respective portion of the shutter transmits light flux to the film, and said control means includes means for determining a minimum exposure interval in accordance with both said maximum film density limit and the brightest of said scene areas, for determining a maximum exposure interval in accordance with both said minimum film density limit and the darkest of said areas, and for controlling said actuating means to operate, for said minimum exposure interval, all shutter portions associated with scene areas which during said minimum interva transmit sufficient flux to expose said film material to at least said minimum film density limit and to operate the remaining shutter portions for said maximum exposure interval.

12. In a camera having a plurality of shutter elements independently and selectively operable to transmit light respectively from a plurality of spacially oriented areas of the scene being photographed to corresponding elemental areas of a film frame of photosensitive material having given maximum and minimum exposure limits, the improvement comprising:

means for sensing the brightness of each of said plurality of spacially oriented areas of said scene; and means responsive to said sensing means for operating said shutter elements for at least a minimum exposure time interval equal to the time required for one shutter element, which transmits light from the scene area having the maximum average brightness, to transmit a predetermined maximum amount of light flux producing a film exposure corresponding to said maximum exposure limit of said film material, for terminating further operation of all shutter elements which during said minimum exposure time interval transmit an amount of light flux less than said predetermined maximum amount but equal to or more than a predetermined minimum amount of light flux defined as that flux producing a film exposure corresponding to said minimum exposure limit, and for continuing operation of remaining shutter elements which during said minimum exposure time interval transmit an amount of light flux of less than said predetermined minimum amount.

13. The improvement of claim 12 wherein said maximum and minimum exposure limits are located near the extremes of the linear portion of the characteristic curve for said photosensitive material.

14. The improvement of claim 12 wherein the operation of each of said remaining shutter elements are continued for exposure time intervals equal to the time required for each of said remaining shutter elements to transmit an amount of light flux equal to said predetermined minimum amount.

15. Exposure control apparatus comprising:
a shutter mechanism constituted by a plurality of shutter elements, independently and selectively operable from a light blocking to a light unblocking condition to transmit light respectively from a plurality of spacially oriented areas of the scene being photographed to corresponding elemental areas of a frame of photosensitive film material, said film material having given upper and lower exposure limits;

a photosenstive device associated with each said shutter element for detecting the average brightness of light transmitted by each said shutter element when the latter is actuated; and means associated with each said shutter element for operating the same, said operating means including independent means for actuating each said shutter element and control means for controlling each said actuating means to initiate operation of each of the shutter elements to transmit light from said scene and for controlling the actuating means associated with the shutter element that transmits light having an extreme average light flux, to operate for a minimum exposure time interval within which this shutter element transmits a predetermined amount of light flux corresponding to either the upper or lower exposure limit of said film material.

16. The apparatus of claim 15 wherein said control means includes means for controlling all said actuating means to simultaneously initiate operation of said elements from their said blocking condition.

17. The apparatus of claim 15 wherein said control means includes means for the actuating means associated with the shutter element that transmits the minimum average light flux, to operate for a minimum exposure interval during which this shutter element transmits a predetermined amount of light corresponding to said upper exposure limit.

18. The apparatus of claim 15 wherein said control means includes means for controlling the actuating means associated with the shutter element that transmits the minimum time average light flux, to operate for a maximum exposure time interval during which this shutter element transmits a predetermined amount of light corresponding to said lower exposure limit of said film material.

19. The apparatus according to claim 15 wherein said operating means includes independent drive means for actuating each said shutter element and means for controlling said drive means and each photosensitive device includes an integrator, responsive to initiation of operation of the shutter element with which each respective photosensitive device is associated, for producing a time-variable signal functionally related to the average brightness of light transmitted by its associated shutter element, and said control means includes an independent comparator responsive to the signal produced by one of said photosensitive devices and associated with the same shutter element as said one photosensitive device for terminating operation of said same shutter element when the signal reaches a predetermined threshold.

20. The apparatus according to claim 19 including control means for causing each said drive means to initiate simultaneous operation of said shutter elements.

21. The apparatus according to claim 19 wherein said control means further includes a threshold generator whose output establishes an initial threshold value, and a gate responsive to termination of operation of at least one of said shutter elements for changing the output of said threshold generator from said initial value to a lower value.

22. The apparatus according to claim 21 wherein said gate is responsive to the state of operation of each shutter element, said gate having a first state when all of said shutter elements are in their said unblocking condition, and a second state when at least one of said shutter elements is in its said blocking condition, said threshold generator being responsive to the state of said first state of said gate for producing an output at said initial threshold value and responsive to said second state of said gate for producing an output at said lower threshold value.

23. The apparatus according to claim 21 wherein said initial and said lower threshold values correspond to preselected higher and lower film density limits located on the linear portion of the characteristic curve of the photosensitive material being used.

24. A photographic method for exposing a frame of film material having a density range extending between given minimum and maximum exposure density limits to a photographic scene having a range of relative brightness exceeding said film density range, said method comprising the steps of:
sensing the brightness of each of a plurality of spacially oriented areas of the scene to be photographed;

defining for the scene area having the maximum average brightness a first exposure factor at which said brightest area will produce a film exposure substantially equal to said maximum film density limit;

selecting all scene areas having a minimum average brightness which at said first exposure factor will produce a film exposure at least substantially equal to said minimum film density limit;

defining at least one second exposure factor at which at least one of the remaining scene areas will produce a film exposure at least substantially equal to said minimum film density limit;

transmitting image-carrying rays under said first exposure factor from said selected scene areas to essentially only elemental areas of said film frame which pictorially correspond to said selected scene areas to maintain the relative brightness of said selected areas in the recorded image; and transmitting image-carrying rays from at least said one of said remaining scene areas under said second exposure factor to the pictorially corresponding elemental area of said film frame to increase the relative brightness of said one scene area in the recorded image to thereby enhance its detail.

25. The method of claim 24 wherein said step of defining at least a second exposure factor includes the step of defining an exposure factor for each of the remaining scene areas which will produce a film exposure for each scene area at least substantially equal to said minimum film density limit.

26. The method of claim 25 wherein said step of defining a first exposure factor comprises defining a first exposure interval at which said brightest scene area will produce said maximum film density, said selecting step comprises selecting all scene areas which during said first exposure interval will produce at least said minimum film density, and said step of defining at least a second exposure factor comprises defining a second exposure interval greater than said first interval and at which said one scene area will produce said minimum film density.

27. The method of claim 26 wherein said step of defining at least a second exposure interval includes defining an exposure interval for each of the remaining scene areas which will produce an exposure of each scene area at least substantially equal to said minimum film density.

28. In a camera having a lens assembly for directing image-carrying rays from a scene to a frame of film material located at the camera focal plane, said film material having a given minimum and maximum exposure density limits, the improvement comprising:

means for sensing the brightness of each of a plurality of spacially oriented areas of said scene and for independently varying the transmission of at least a significant portion of the image-carrying rays from each said scene area to a pictorially corresponding area of said film material; and control means responsive to said brightness sensing means for defining at least a first and a second exposure factor in accordance with the brightness of said scene areas and said film limits, and for selectively controlling said transmission varying means to vary the transmission from a plurality of said scene areas in accordance with said first exposure factor to thereby expose a plurality of corresponding film areas at said first exposure factor and to vary the transmission from at least one other scene area in accordance with said second exposure factor to thereby expose at least one other corresponding film area at said second exposure factor so as to essentially retain in the recorded image the relative brightness of scene areas pictorially corresponding to said plurality of film areas while varying with respect thereto the brightness in the recorded image of at least the scene area pictorially corresponding to said one other film area.

29. The improvement of claim 28 wherein said control means includes means for determining said first of said exposure factors in accordance with either the brightest or darkest of said scene areas.

30. A photographic method for exposing a frame of film material having a density range extending between given minimum and maximum exposure density limits to a photographic scene having a range of relative brightness exceeding said film density range, said method comprising the steps of:

sensing the brightness of each of a plurality of spacially oriented areas of the scene to be photographed;

defining for one scene area a first exposure factor at which said one scene area will produce a film exposure substantially equal to said maximum film density limit;

selecting all scene areas having a minimum average brightness which at said first exposure factor will produce a film exposure at least substantially equal to said minimum film density limit;

defining at least one second exposure factor at which at least one of the remaining scene areas is expected to produce a film exposure at least substantially equal to said minimum film density limit;

transmitting image-carring rays under said first exposure factor from said selected scene areas to essentially only elemental areas of said film frame which pictorially correspond to said selected scene areas to maintain the relative brightness of said selected areas in the recorded image; and transmitting image-carrying rays from at least said one of said remaining scene areas under said second exposure factor to the pictorially corresponding elemental area of said film frame to increase the relative brightness of said one scene area in the recorded image to thereby enhance its detail.

31. The method of claim 30 wherein said step of defining at least a second exposure factor includes the step of defining an exposure factor for each of the remaining scene areas which will produce a film exposure for each scene area at least substantially equal to said minimum film density limit.

* * * * *